HENRY C. TAYLOR.
Improvement in Expansion Arbor.
No. 128,260.          Patented June 25, 1872.
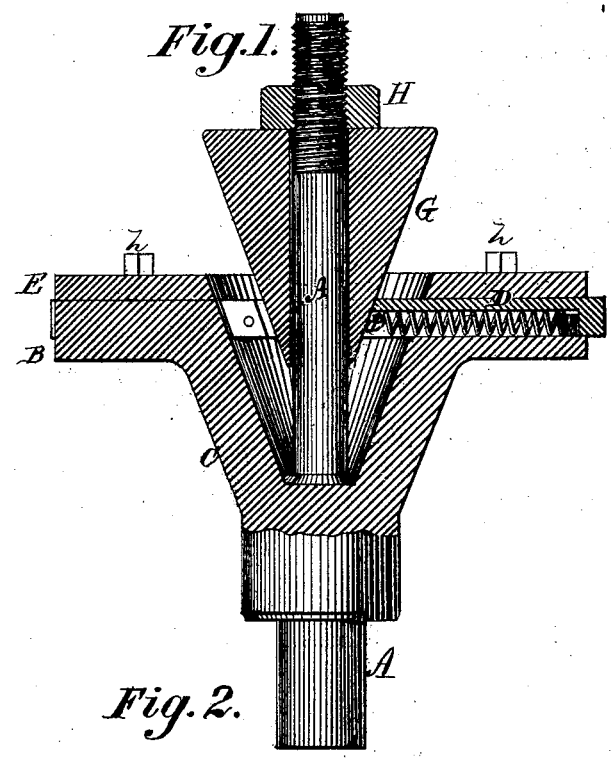
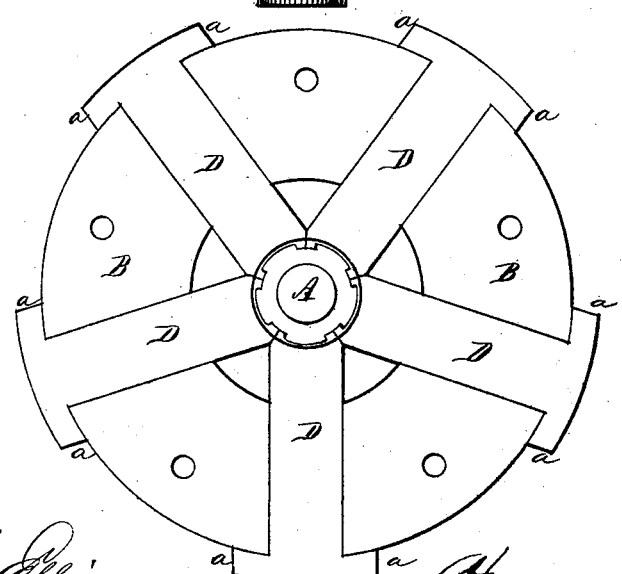

UNITED STATES PATENT OFFICE.

HENRY C. TAYLOR, OF MARQUETTE, MICHIGAN.

IMPROVEMENT IN EXPANSION ARBORS.

Specification forming part of Letters Patent No. 128,260, dated June 25, 1872.

SPECIFICATION.

*To all whom it may concern:*

Be it known that I, H. C. TAYLOR, of Marquette, in the county of Marquette and State of Michigan, have invented certain new and useful Improvements in Ring-Chucks and Expansion Arbors; and I do hereby declare that the following is a full, clear, and exact description thereof, reference being had to the accompanying drawing and to the letters of reference marked thereon which form a part of this specification.

The nature of my invention consists in the construction and arrangement of a combined ring-chuck and expansion arbor for turning piston-rings, large pipe, or cylinders, or anything else of cylindrical form in a lathe, as will be hereinafter more fully set forth.

In order to enable others skilled in the art to which my invention appertains to make and use the same, I will now proceed to describe its construction and operation, referring to the annexed drawing, in which—

Figure 1 represents a longitudinal section; Fig. 2, a plan view of the head, showing the jaws D.

A represents a part of the arbor upon which my chuck is firmly secured. B is the head of the chuck, made in circular form with a central circular opening, through the center of which the arbor A passes. The head B is provided with a conical hub, C, which is firmly secured in any suitable manner upon the arbor A. In the face of the head B, are made a series of recesses at equal distances apart and extending entirely across from the inner to the outer circumference of the head, the recesses radiating from the center of the head. In each of these recesses is placed a jaw, D, provided at its outer end with wings $a\ a$, which are curved so as to fit the outer circumference of the head. These jaws are of such length as to extend nearly to the arbor A, and their inner ends are beveled and concaved, as shown.

The under side of each jaw D is provided with a deep longitudinal groove, in which is placed a spiral spring, $b$, one end of which bears against a pin, $d$, in the inner end of the jaw, while the other end of the spring bears against a stud or pin, $e$, in the recess of the head near its outer end. Thus the tendency of the spring $b$ is to draw the jaw inward. The recess for this spring may be made in the head if so desired. The entire face of the head B, with the jaws D D, is covered by a plate or ring, E, which is fastened by screws or other suitable means. On the arbor A is now placed a cone, G, the apex of which enters the aperture in the center of the head, and bears against the inner concave ends of the jaws D D. This cone is pressed inward by means of a nut, H, screwed on the arbor A, and thereby forces the jaws D D outward, so that any ring or cylindrical article can readily be centered on the same for working the same in a lathe. Any lost motion of the jaws D D is readily taken up by set-screws $h\ h$ passing through the face-plate E, one on each jaw.

Two of these heads being used on one long arbor, form an expansion arbor, constituting a very useful tool for the purposes described.

Having thus fully described my invention, what I claim as new, and desire to secure by Letters Patent, is—

The jaws D D, constructed as described, with a longitudinal groove in their under sides and placed in radiating recesses on the head B, in combination with the springs $b$, pins $d$, and studs $e$, substantially as and for the purposes herein set forth.

In testimony that I claim the foregoing as my own I affix my signature in presence of two witnesses.

HENRY C. TAYLOR.

Witnesses:
 A. P. BURROUGHS,
 PETER C. PARKINSON.